Patented Aug. 11, 1925.

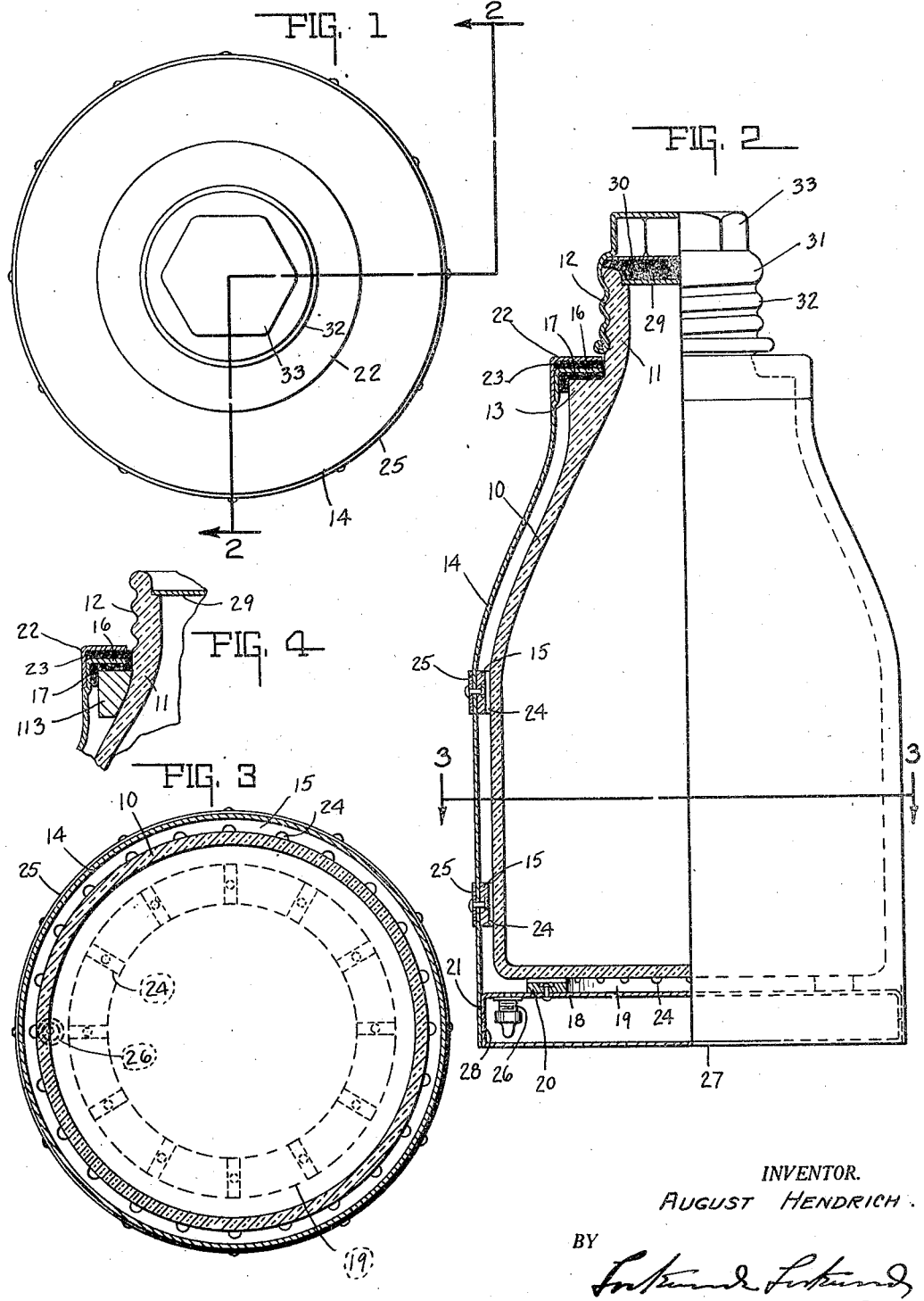

1,549,417

UNITED STATES PATENT OFFICE.

AUGUST HENDRICH, OF MARTINSVILLE, INDIANA, ASSIGNOR TO LOUIS HENDRICH, OF DETROIT, MICHIGAN.

VACUUM CASING FOR CONTAINERS.

Application filed July 23, 1923. Serial No. 653,303.

*To all whom it may concern:*

Be it known that I, AUGUST HENDRICH, a citizen of the United States, and a resident of Martinsville, county of Morgan, and State of Indiana, have invented a certain new and useful Vacuum Casing for Containers; and I do hereby declare that the following is a full, clear, and exact description thereof, reference being had to the accompanying drawings, in which like numerals refer to like parts.

This invention relates to a vacuum casing for maintaining a vacuum about a jar or bottle of ordinary construction.

The main object of the invention is to construct a vacuum container or casing for a bottle, jar or the like primarily for the shipping of bottled milk, wherein the bottle would be both protected from breakage, and from the surrounding air, whereby it may maintain the temperature of the contents for an appreciable time. Thus, the country dairyman may cool his milk, bottle it in the cooled condition, ship the bottles to the city, where the milk will be consumed, without necessitating the bottle being placed on ice, either during shipment or in the home. This eliminates the necessity of shipping the milk in bulk and having it treated and bottled in the city.

One feature of the invention resides in the construction of the container, which will not only protect the bottle from breakage, but will also permit the vacuum to be created between the container and the bottle for maintaining it at a substantially constant temperature for several days.

Another feature of the invention resides in the adaptability of the structure to the ordinary milk bottle.

The full nature of the invention will be understood from the accompanying drawings and the following description and claims.

In the drawings, Fig. 1 is a plan view looking down on top of the container. Fig. 2 is a section taken on the line 2—2 of Fig. 1. Fig. 3 is a section on the line 3—3 of Fig. 2. Fig. 4 is a modified form showing the casing applied to the ordinary milk bottle.

In the drawings there is shown a bottle or jar 10 which may be used for containing milk, cream or any other liquid, and may be made of glass, porcelain, or other suitable material, said bottle being provided with a neck 11, having screw threads 12 formed about the periphery thereof. Immediately below the neck 11, there is a shoulder 13 formed on the bottle and extending radially therefrom about the periphery with a flat upper surface. The body portion of the bottle is surrounded by a casing 14 formed of sheet metal or other suitable material, which conforms to the shape of the bottle, and is spaced therefrom by the spacing rings 15 secured about the inner wall thereof. Said casing 14 is mounted over the top of the bottle and is provided with an inwardly extending flange 16 at the top adapted to lie parallel to the flat surface of the shoulder 13 and be spaced therefrom by the rubber gasket or cushion 17.

After the casing is spaced from the top of the bottle, a false bottom 18 is placed in the bottom thereof so as to lie adjacent the bottom of the bottle and be spaced therefrom by the cushion ring 19, said ring abutting the bottom of the bottle and being held in position by the securing ring 20 which is rigidly secured to the bottom 18. Upon the casing 14 being forced down under pressure over the bottle so that the flange 16 presses against the rubber 17, the downwardly extending annular flange 21 of the bottom 18 is soldered or otherwise rigidly secured to the wall of the casing. The bottle will then be firmly held within the casing and spaced therefrom by the rings 15 and 19, after which the upper portion thereof will be further sealed by mounting the ring 22 thereover and soldering it, or rigidly securing it about the top of said casing. The ring 22 will be spaced from the flange 16 by the rubber gasket 23, which also engages the neck of the bottle, whereby there will be a double seal between the exterior of the casing and the interior thereof about said neck.

The rings 15 and 19 may be formed of wood fiber or the like and provided with a plurality of air grooves 24 for permitting the air to be drawn therethrough when the vacuum is created. The rings 15 may be held in place by riveting the same to an outer metal reinforcing ring or band 25.

In the false bottom 18, there is provided a downwardly extending air valve 26 to which a pump may be attached for withdrawing the air from the enclosed space surrounding the bottom through the grooves 15 in the rings, whereby a vacuum or a partial vacuum will be created. The bottom plate 27 is provided with upwardly extending annular flanges 28 adapted to telescope within the lower end of the casing 14 so as to protect the valve 26 and afford a support for the bottle.

For closing the top of the bottle, there is provided the usual milk bottle seal 29 against which a rubber cushion 30 may be forced for completely sealing the opening, said rubber cushion 30 being carried by the cap 31 having screw threads 32 formed thereon for permitting the same to be screwed down over the screw threads 12. The top of the cap 31 is provided with a hexagonal grasping portion 33 for permitting it to be readily grasped and turned for removing.

In the modified form shown in Fig. 4, the casing is applied to an ordinary milk bottle, by mounting a ring 113 about the periphery of the neck adapted to bear against the sloping surface thereof, which will present a flat top surface against which the double seals 17 and 23 may be pressed by the flanges 16 and 22. This arrangement will permit the user of the device to apply the casing to his stock of milk bottles on hand, without the necessity of obtaining new and particularly constructed bottles.

The invention claimed is:

1. The combination with a liquid container, of means for protecting said container comprising a surrounding casing adapted to be mounted over the top and conforming to the shape thereof, means for spacing said casing from the walls and bottom of said container, a shoulder positioned about the periphery of said casing, an inwardly extending flange formed on the top of said casing, a sealing ring positioned between said flange and shoulder, a ring surrounding said container flange and rigidly secured thereover, a sealing ring positioned between said ring and flange, whereby a double seal will be formed about said container, and a bottom adapted to be secured to the bottom of said casing and spaced from said container for rigidly securing the casing thereon.

2. The combination with a liquid container, of means for protecting said container comprising a surrounding casing adapted to be mounted over the top and conforming to the shape thereof, a plurality of spacing rings having air grooves therein positioned between the inner wall of said casing and the outer wall of said container for spacing them apart, sealing means positioned between the top of said casing and said container, a ring positioned about the top of said casing, an inwardly extending flange formed on the top of said casing, a sealing ring positioned between said flange and top ring, and a bottom adapted to be secured to the bottom of said casing and spaced from said container for rigidly securing the casing thereon.

3. The combination with a liquid container, of means for protecting said container comprising a surrounding casing adapted to be mounted over the top and conforming to the shape thereof, a plurality of spacing rings having air grooves therein positioned between the inner wall of said casing and the outer wall of said container for spacing them apart, sealing means positioned between the top of said casing and said container, a ring positioned about the top of said casing, an inwardly extending flange formed on the top of said casing, a sealing ring positioned between said flange and top ring, a bottom adapted to be secured to the bottom of said casing and spaced from said container for rigidly securing the casing thereon, a valve positioned in the bottom of said casing for withdrawing the air contained therein, whereby a vacuum will be created, and a bottom plate removably attached to said container for enclosing said bottom and valve.

In witness whereof, I have hereunto affixed my signature.

AUGUST HENDRICH.